United States Patent
Komori

(10) Patent No.: US 12,424,623 B2
(45) Date of Patent: Sep. 23, 2025

(54) ACTIVE MATERIAL, NEGATIVE ELECTRODE ACTIVE MATERIAL, AND FLUORIDE ION SECONDARY BATTERY

(71) Applicant: Panasonic Corporation, Osaka (JP)

(72) Inventor: Tomoyuki Komori, Osaka (JP)

(73) Assignee: PANASONIC HOLDINGS CORPORATION, Osaka (JP)

(*) Notice: Subject to any disclaimer, the term of this patent is extended or adjusted under 35 U.S.C. 154(b) by 684 days.

(21) Appl. No.: 17/326,384

(22) Filed: May 21, 2021

(65) Prior Publication Data

US 2021/0273222 A1    Sep. 2, 2021

Related U.S. Application Data

(63) Continuation of application No. PCT/JP2019/039068, filed on Oct. 3, 2019.

(30) Foreign Application Priority Data

Jan. 28, 2019    (JP) .................. 2019-011993

(51) Int. Cl.
     *H01M 4/58* (2010.01)
     *H01M 4/04* (2006.01)
     *H01M 10/36* (2010.01)
     *H01M 4/02* (2006.01)

(52) U.S. Cl.
     CPC ........... *H01M 4/58* (2013.01); *H01M 4/0407* (2013.01); *H01M 10/36* (2013.01); *H01M 2004/027* (2013.01); *H01M 2004/028* (2013.01)

(58) Field of Classification Search
     CPC ........ H01M 4/58; H01M 4/0407; H01M 10/36
     See application file for complete search history.

(56) References Cited

U.S. PATENT DOCUMENTS

2017/0346316 A1   11/2017   Nakamoto et al.
2018/0159129 A1*   6/2018   Ide .......................... C01F 17/36

FOREIGN PATENT DOCUMENTS

| JP | 2013-145758 | 7/2013 |
| JP | 2016-021276 | 2/2016 |
| JP | 2017-216048 | 12/2017 |
| JP | 2018-092863 | 6/2018 |

OTHER PUBLICATIONS

Bai et al. (Nano Energy (2015) 17, 140-151).*
Guelin et al. (Z. anorg. allg. Chem. 557 (1988) 225-233).*
International Search Report of PCT application No. PCT/JP2019/039068 dated Dec. 10, 2019.
English Translation of Chinese Search Report dated Aug. 19, 2023 for the related Chinese Patent Application No. 201980036806.7.
J. Guelin et al, "New A0.5A'0.5F3 Ferroelastic Phases with VF3 Structure (A, A'=Al, Ti, Cr, In, Ti)", Z. anorg. allg. Chem , vol. 557, pp. 225-233, Dec. 31, 1988.

* cited by examiner

*Primary Examiner* — Olatunji A Godo
(74) *Attorney, Agent, or Firm* — Rimon P.C.

(57) ABSTRACT

An active material contains a composite metal fluoride containing Al, F, and Ti and can occlude and release fluoride ions. The composite metal fluoride is represented by a compositional formula: $Al_{1-x}Ti_xF_y$, where x satisfies $0.01 \leq x \leq 0.9$ and y satisfies $2 \leq y \leq 4$.

4 Claims, 4 Drawing Sheets

ACTIVE MATERIAL, NEGATIVE ELECTRODE ACTIVE MATERIAL, AND FLUORIDE ION SECONDARY BATTERY

BACKGROUND

1. Technical Field

The present disclosure relates to an active material, a negative electrode active material, and a fluoride ion secondary battery.

2. Description of the Related Art

In recent years, fluoride ion secondary batteries using fluoride ions have been proposed.

For example, Japanese Unexamined Patent Application Publication No. 2013-145758 discloses a fluoride ion electrochemical cell. This literature discloses $CF_x$, $AgF_x$, $CuF_x$, $NiF_x CoF_x$, $PbF_x$, and $CeF_x$ as positive electrode materials and discloses $LaF_x$, $CaF_x$, $AlF_x$, $EuF_x$, $LiC_6$, $Li_xSi$, $SnF_x$, and $MnF_x$ as negative electrode materials.

SUMMARY

In one general aspect, the techniques disclosed here feature an active material comprising a composite metal fluoride containing Al, F, and Ti and capable of occluding and releasing fluoride ions. The composite metal fluoride is represented by a compositional formula: $Al_{1-x}Ti_xF_y$, where x satisfies $0.01 \leq x \leq 0.9$ and y satisfies $2 \leq y \leq 4$.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
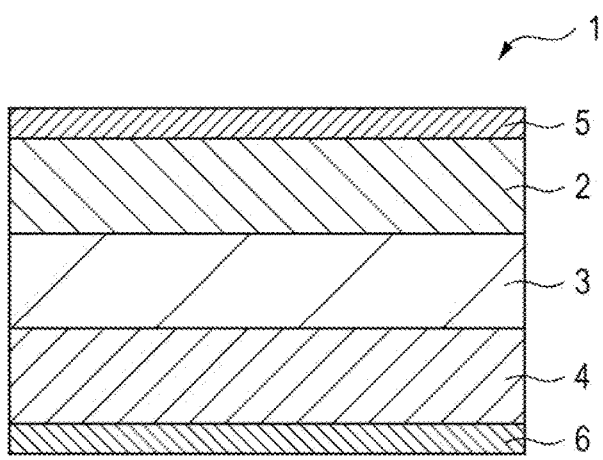
FIG. 1 is a cross-sectional view schematically illustrating a fluoride ion secondary battery of an embodiment of the present disclosure.

A fluoride ion secondary battery including fluoride ion ($F^{-1}$) as a carrier can have, for example, high stability, a high energy density, and a high output density. For example, as a fluoride ion secondary battery that can further improve the energy density, an innovative storage battery (also called "reservoir storage battery", "fluoride shuttle secondary battery", etc.) has been paid attention.

However, fluoride ion secondary batteries are still in research and development. In order to improve the performance of a fluoride ion secondary battery, for example, it is required to more increase the charge and discharge capacity of the active material used in the fluoride ion secondary battery.

The present inventors found a material that can exhibit higher charge and discharge capacities and accomplished the fluoride active material of the present disclosure. The use of the fluoride active material of the present disclosure in a negative electrode or a positive electrode can realize, for example, a fluoride ion secondary battery having high performance.

Outline of Various Aspects of the Present Disclosure

The present disclosure includes active materials and fluoride ion secondary batteries described in the following items.

[Item 1]

An active material contains a composite metal fluoride containing Al, F, and a metal element Me and is capable of occluding and releasing fluoride ions. The metal element Me includes at least one transition metal element selected from the group consisting of Ti, Fe, Co, Ni, and Cu and/or at least one alkaline-earth metal element selected from the group consisting of Ca, Ba, and Sr.

[Item 2]

In the active material according to item 1, the composite metal fluoride may have a crystal structure, and the metal element Me may be located at Al site in the crystal structure.

[Item 3]

In the active material according to item 1 or 2, the metal element Me may include the transition metal element.

[Item 4]

In the active material according to item 3, the transition metal element may be at least one selected from the group consisting of Ti, Fe, Co, and Ni.

[Item 5]

In the active material according to item 1 or 2, the metal element Me may include the alkaline-earth metal element.

[Item 6]

In the active material according to item 5, the alkaline-earth metal element may be Ca.

[Item 7]

In the active material according to item 1 or 2, the metal element Me may contain Ti, and the molar ratio between Al and Ti in an average composition of the active material may satisfy Al:Ti=$_{1-x}$:x, where x may satisfy $0.01 \leq x \leq 0.9$.

[Item 8]

In the active material according to item 7, x may satisfy $0.01 \leq x \leq 0.3$.

[Item 9]

In the active material according to item 8, x may satisfy $0.01 \leq x \leq 0.15$.

[Item 10]

In the active material according to any one of items 1 to 9, the composite metal fluoride may be represented by a compositional formula: $Al_{1-x}Me_xF_y$, where x may satisfy $0 \leq x \leq 1$ and y may satisfy $2 \leq y \leq 4$.

[Item 11]

In the active material according to item 1 or 2, the composite metal fluoride may be represented by a compositional formula: $Al_{1-x}Ti_xF_y$, where x may satisfy $0.01 \leq x \leq 0.15$ and y may satisfy $2 \leq y \leq 4$.

[Item 12]

A negative electrode active material contains a composite metal fluoride containing Al, F, and a metal element Me and is capable of occluding and releasing fluoride ions. The metal element Me includes at least one transition metal element selected from the group consisting of Ti, Fe, Co, Ni, and Cu and/or at least one alkaline-earth metal element selected from the group consisting of Ca, Ba, and Sr.

[Item 13]

A fluoride ion secondary battery includes:
a positive electrode layer,
a negative electrode layer containing the active material according to any one of items 1 to 11, and
an electrolyte layer disposed between the positive electrode layer and the negative electrode layer.

[Item 14]

In the fluoride ion secondary battery according to item 13, the positive electrode layer may contain a positive electrode active material, and
the positive electrode active material may contain at least one selected from the group consisting of Co, Cu, Bi, Sn, Pb, Fe, Zn, Ga, and C.

EMBODIMENT

Embodiments of the present disclosure will now be described with reference to the drawings. Incidentally, embodiments described below all show comprehensive or specific examples. The numbers, shapes, materials, components, arrangement positions and connection configuration of the components, process conditions, steps, the order of the steps, etc. shown in the following embodiments are merely examples and are not intended to limit the present disclosure. In addition, among the components in the following embodiments, components that are not mentioned in any independent claim describing the broadest concept will be described as optional components. Incidentally, each drawing is a schematic view and is not necessarily exactly illustrated. In the following description, a material represented by the substance name is not limited to the stoichiometric composition and encompasses the non-stoichiometric composition unless otherwise specified.

Incidentally, when the negative electrode active material has a single phase structure of a compound phase, the "average composition" represents the composition of the compound. Alternatively, when the negative electrode active material has a multiple phase structure of a compound phase and a mixture phase, the "average composition" represents the composition obtained by performing elementary analysis of the negative electrode active material without considering the distinction between phases. "Without considering the distinction between phases" typically means a composition obtained by performing elementary analysis using a larger sample than the size of the raw material powder of the fluoride ion conductor.

The average composition can be identified by a combination of inductively coupled plasma (ICP) emission spectrochemical analysis and ion chromatography. For example, the metal contained in the fluoride ion conductor is analyzed by ICP emission spectrochemical analysis, and fluorine is analyzed by ion chromatography.

Incidentally, in the present disclosure, "consisting of X" does not disclaim active material containing impurities that are inevitably mixed in the raw materials or during the manufacturing process. Here, the inevitably mixed impurities mean impurities contained in a negative electrode active material in an amount of, for example, less than 0.05 mol %.

Active Material

The active material of the present disclosure (hereinafter, referred to as "fluoride ion active material") includes a composite metal fluoride containing Al, F, and a metal element Me. The metal element Me includes at least one transition metal element selected from the group consisting of Ti, Fe, Co, Ni, and Cu and/or at least one alkaline-earth metal element selected from the group consisting of Ca, Ba, and Sr.

The composite metal fluoride can have, for example, a crystal structure. The metal element Me may be located at the Al site. As an example, a part of Al in the crystal structure of $AlF_3$ (octahedron structure with Al at the center) may be substituted with the metal element Me. In addition, in the composite metal fluoride, a part of fluorine may be deficient.

The composite metal fluoride may be represented by a compositional formula: $Al_{1-x}Me_xF_y$ ($0 \leq x \leq 1$). The composition ratio (molar ratio) y of F can be within a range of $2 \leq y \leq 4$ depending on the valence of the metal element Me.

Assumed Mechanism

The fluoride ion active material of the present disclosure shows higher charge capacity and discharge capacity than a compound composed of Al and F, more specifically, $AlF_3$. As the reason for this, it is inferred, for example, that in the fluoride ion active material of the present disclosure, an electrical and/or structural change is partially caused by adding a metal element Me other than Al to Al and F to allow fluoride ions to easily move.

The crystal state of the fluoride ion active material of the present disclosure is not limited, and the fluoride ion active material can be in a single crystal, polycrystal, amorphous, solid solution, or mixture state or a combination thereof. For example, the molar proportion of the solid solution is 15% or less, and the residue may be a mixture.

It is inferred that when the composite metal fluoride has a crystal structure, the charge balance is broken by substituting the Al site of $AlF_3$ with a metal element Me having a valence different from that of Al to allow the fluoride ions to more easily move. In addition, it is inferred that even when the Al site is substituted with a metal element Me having the same valence with that of Al, as long as the ionic radius of the metal element Me is different from that of Al, the structure of $AlF_3$ is changed, and the fluoride ions easily move. Incidentally, "having a crystal structure" indicates a crystalline state and does not include an amorphous state.

The shape of the fluoride ion active material of the present disclosure is not limited. The material can have an arbitrary shape, such as particle, film, sheet, disk, bulk, or compact. The material can have a shape, for example, capable of being accommodated in the housing of a fluoride ion secondary battery described below. The material can have a shape, for example, capable of being stacked with the electrolyte layer of a fluoride ion secondary battery described below. The fluoride ion active material of the present disclosure can be a material capable of occluding and releasing solid fluoride.

The use of the fluoride ion active material of the present disclosure is not limited. The material is used, for example, as a material that occludes and releases solid fluoride ions. This material may be used as the negative electrode active material or may be used as the positive electrode active material as long as the fluoride ion secondary battery is operated. The fluoride ion active material of the present disclosure can be used, for example, in a fluoride ion secondary battery. The fluoride ion secondary battery is a rechargeable secondary battery. In a fluoride ion secondary battery, fluoride ions move between a positive electrode and a negative electrode through an electrolyte to perform charging and discharging. As the material that occludes and releases solid fluoride ions contained in the negative electrode layer of the battery, the fluoride ion active material of the present disclosure can be used.

The fluoride ion secondary battery using the fluoride ion active material of the present disclosure can be an all-solid-state secondary battery and/or a liquid secondary battery. For example, an all-solid-state secondary battery is highly safe and can have a high energy density depending on the configuration of a positive electrode layer, an electrolyte layer, and a negative electrode layer.

The method for manufacturing the fluoride ion active material of the present disclosure is not limited. For example, the material can be manufactured by mixing aluminum fluoride and titanium fluoride such that the content molar ratio between Al and Ti after mixing becomes a desired value. When the mixing is performed using a grinder, such as a ball mill or a rod mill, or a particle mixing device, the composition of the ion conductive material is further homogenized. The aluminum fluoride is, for example, $AlF_3$. The titanium fluoride is, for example, $TiF_3$. The fluoride ion active material after mixing can be processed into a prescribed shape by molding. As the molding, for example, pressing or sintering can be utilized.

The metal element Me may include a transition metal element. In such a case, the transition metal element may be at least one element selected from the group consisting of Ti, Fe, Co, and Ni. Alternatively, the metal element Me may include an alkaline-earth metal element. In such a case, the alkaline-earth metal element may be Ca. Consequently, further high charge capacity and discharge capacity can be obtained.

Incidentally, the fluoride ion active material of the present disclosure may include a plurality of metal elements as the metal element Me. For example, the fluoride ion active material may include a plurality of transition metal elements selected from the group consisting of Ti, Fe, Co, Ni, and Cu or may include a plurality of alkaline-earth metal elements selected from the group consisting of Ca, Ba, and Sr. Alternatively, the fluoride ion active material of the present disclosure may include both one or more transition metal elements and one or more alkaline-earth metal elements.

The fluoride ion active material of the present disclosure may include an element other than the above-mentioned alkaline-earth metals or transition metal elements. For example, when the composite metal fluoride has a crystal structure, the substitution element of Al may include another metal element as long as the molar proportion of the elements selected from the above-mentioned alkaline-earth metal or transition metal elements is 50% or more of the fluoride ion active material.

In addition, when the metal element Me is Ti, the molar ratio between Al and Ti in the average composition of the fluoride ion active material may satisfy Al:Ti=1-x:x, where $0.01 \leq x \leq 0.9$, and x may satisfy $0.01 \leq x \leq 0.3$, further $0.01 \leq x \leq 0.15$.

The composite metal fluoride in the fluoride ion active material may be that represented by a compositional formula: $Al_{1-x}Ti_xF_y$. Here, x may satisfy $0.01 \leq x \leq 0.15$. Incidentally, the composition ratio y of F can be within a range of $2 \leq y \leq 4$ depending on the valence of the metal element Me.

The fluoride ion active material of the present disclosure is used as the negative electrode active material or positive electrode active material of a fluoride ion secondary battery. The use of the fluoride ion active material of the present disclosure as the negative electrode active material has a merit that the reduction resistance of the negative electrode active material is high compared with the case of using a metal simple substance as the negative electrode active material and the fluoride ion active material as the positive electrode active material.

When the fluoride ion active material of the present disclosure is used as the negative electrode active material of a fluoride ion secondary battery, it is inferred that when the composite metal fluoride contained in the negative electrode active material is represented by $MF_y$ (M is, for example, $Al_{1-x}Me_x$), the charge reaction is as follows:

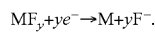

Fluoride Ion Secondary Battery

A fluoride ion secondary battery of an embodiment will now be described. Here, although an example in which the above-described fluoride ion active material is used in the negative electrode will be described, the fluoride ion active material may be used in the positive electrode.

FIG. 1 is a cross-sectional view schematically illustrating the configuration of a fluoride ion secondary battery of the present embodiment.

The fluoride ion secondary battery 1 shown in FIG. 1 includes a positive electrode layer 2, a negative electrode layer 4, and an electrolyte layer 3. The electrolyte layer 3 is disposed between the positive electrode layer 2 and the negative electrode layer 4. The positive electrode layer 2 and the electrolyte layer 3 are in contact with each other. In addition, the negative electrode layer 4 and the electrolyte layer 3 are in contact with each other.

The positive electrode layer 2, the electrolyte layer 3, and the negative electrode layer 4 are all solids. The battery 1 is an all-solid-state secondary battery.

The positive electrode layer 2 includes, for example, a positive electrode active material and a solid electrolyte having fluoride ion conductivity. The electrolyte layer 3 includes a solid electrolyte having fluoride ion conductivity. The negative electrode layer 4 includes, for example, a negative electrode active material and a solid electrolyte having fluoride ion conductivity. In the battery 1, the negative electrode active material contained in the negative electrode layer 4 is the fluoride ion active material of the present disclosure.

The battery 1 having high charge-discharge behavior can be constructed by using the fluoride ion active material of the present disclosure, in particular, using the material in the negative electrode layer 4.

The electrolyte layer 3 is a layer having fluoride ion conductivity in the thickness direction, i.e., the stacking direction of the positive electrode layer 2 and the negative electrode layer 4. Typically, the electrolyte layer 3 does not have electron conductivity in the thickness direction. The thickness of the electrolyte layer 3 is, for example, 1 to 1,000 µm. The thickness of the electrolyte layer 3 can be 200 to 800 µm and further 300 to 700 µm. When the electrolyte layer 3 has a thickness within these ranges, electrical short circuit between the positive electrode layer 2 and the negative electrode layer 4 is suppressed, and the conductivity of fluoride ions can be more reliably secured. It is possible to construct a battery 1 having higher output characteristics by being capable of more reliably securing the conductivity of fluoride ions.

The specific configuration of the electrolyte layer 3 is not limited. The electrolyte layer 3 may be a solid electrolyte or may be a liquid electrolyte.

Solid Electrolyte

The electrolyte layer 3 is, for example, a thin film including a fluoride ion conductive material. The electrolyte layer 3 can be an aggregate of particles of a fluoride ion conductive material. Examples of the ion conductive material include a Pb—K composite fluoride, a La—Ba composite fluoride, a Ce—Sr composite fluoride, a Cs—Ca composite fluoride, a Ce—Sr—Li composite fluoride, a Pb—Sn composite fluoride, a Pb—Sn—Zr composite fluoride, a La—Ca composite fluoride, a La—Sr composite fluoride, a K—Ca composite fluoride, a K—Sr composite fluoride, a K—Ba composite fluoride, and a Rb—Mg composite fluoride. The electrolyte layer 3 can include a material other than the fluoride ion conductive material as long as the battery 1 functions as a fluoride ion secondary battery.

Liquid Electrolyte

All or part of the electrolyte layer 3 may be a liquid electrolyte as long as the battery 1 functions as a fluoride ion secondary battery. For example, in FIG. 1, the region indicated by reference numeral "3" may be a liquid electrolyte. The liquid electrolyte may infiltrate in, for example, a separator.

Examples of the material for the separator include a porous film, woven fabric, and nonwoven fabric.

The liquid electrolyte includes a solvent and a fluoride salt dissolved in the solvent and has fluoride ion conductivity. The solvent may be, for example, a nonaqueous solvent.

Examples of the nonaqueous solvent include an alcohol, a cyclic ether, a chain ether, a cyclic carbonate, a chain carbonate, a cyclic carboxylate, and a chain carboxylate.

Examples of the alcohol include ethanol, ethylene glycol, and propylene glycol.

Examples of the cyclic ether include 4-methyl-1, 3-dioxolane, 2-methyltetrahydrofuran, and crown ether. Examples of the chain ether include 1, 2-dimethoxyethane, ethylene glycol dimethyl ether, diethylene glycol dimethyl ether, triethylene glycol dimethyl ether, and tetraethylene glycol dimethyl ether. Examples of the cyclic carbonate include ethylene carbonate, propylene carbonate, butylene carbonate, fluoroethylene carbonate, and 4, 5-difluoroethylene carbonate. Examples of the chain carbonate include dimethyl carbonate, ethyl methyl carbonate, and diethyl carbonate. Examples of the cyclic carboxylate include γ-butyrolactone. Examples of the chain carboxylate include ethyl acetate, propyl acetate, and butyl acetate.

For example, the nonaqueous solvent may be an ionic liquid.

Examples of the cation of the ionic liquid include 1-ethyl-3-methylimidazolium cation, 1-ethylpyridinium cation, 1-methoxyethyl-1-methylpyrrolidinium cation, N-methyl-N-propylpiperidinium cation, trimethylbutylammonium cation, N, N-diethyl-N-methylmethoxyethylammonium cation, tetrabutylphosphonium cation, triethyl-(2-methoxyethyl) phosphonium cation, triethylsulfonium cation, and diethyl-(2-methoxyethyl)sulfonium cation.

Examples of the anion of the ionic liquid include bis(fluorosulfonyl)amide anion, bis(trifluoromethanesulfonyl)amide anion, hexafluorophosphate anion, tri(pentafluoroethyl)trifluorophosphate anion, trifluoromethanesulfonate anion, and tetrafluoroborate anion.

The electrolyte may contain only one solvent or may contain two or more solvents.

As examples of the fluoride salt, an inorganic fluoride salt, an organic fluoride salt, and an ionic liquid can be mentioned.

Examples of the inorganic fluoride salt include lithium fluoride, sodium fluoride, potassium fluoride, rubidium fluoride, cesium fluoride, and aluminum fluoride.

Examples of the organic fluoride salt include tetramethylammonium fluoride, neopentyltrimethylammonium fluoride, trineopentylmethylammonium fluoride, tetraneopentylammonium fluoride, 1, 3, 3, 6, 6-hexamethylpiperidinium fluoride, 1-methyl-1-propylpiperidinium fluoride, tetramethylphosphonium fluoride, tetraphenylphosphonium fluoride, and trimethylsulfonium fluoride.

The electrolyte may contain only one fluoride salt or may contain two or more fluoride salts.

The positive electrode layer 2 is a layer including a positive electrode active material. The positive electrode layer 2 may be a positive electrode mixture layer including a positive electrode active material and an electrolyte having fluoride ion conductivity.

The positive electrode active material is a material that can occlude and release fluoride ions as the battery is charged and discharged. The occlusion and releasing include both a form accompanied by a chemical reaction with fluoride ions and a form not accompanied by a chemical reaction, such as intercalation. The chemical reaction includes a reaction of forming a compound and a reaction of forming a complex other than a compound such as an alloy and a solid solution.

The positive electrode active material can be a material showing a noble potential when displayed by a standard electrode potential compared with the negative electrode active material of the negative electrode layer 4 combined in the battery 1.

The positive electrode active material includes at least one element selected from, for example, Co, Cu, Bi, Sn, Pb, Fe, Zn, Ga, and C. The positive electrode active material can be a simple substance, complex such as an alloy and a solid solution, or compound of the at least one element above. The compound is, for example, a fluoride of the above-mentioned metal. C (carbon) is, for example, graphite or non-graphite carbon such as hard carbon and coke. When carbon is used as the positive electrode active material, the manufacturing cost of the battery 1 can be reduced, and the average discharge voltage can be increased.

The thickness of the positive electrode layer 2 is, for example, 1 to 500 μm. The thickness of the positive electrode layer 2 can be 1 to 400 μm and further can be 50 to 200 μm. When the positive electrode layer 2 has a thickness within these ranges, the energy density of the battery 1 can be further improved, and more stable operation at high output is possible.

The specific configuration of the positive electrode layer 2 is not limited. The positive electrode layer 2 is, for example, a thin film including a positive electrode active material and a fluoride ion conductive material. The positive electrode layer 2 can include particles of a positive electrode active material and particles of a fluoride ion conductive material. The fluoride ion conductive material can be the fluoride ion conductive material of the present disclosure.

The positive electrode layer 2 can include a material other than the above-mentioned materials as long as the battery 1 functions as a fluoride ion secondary battery, The negative electrode layer 4 is a layer including a negative electrode active material. In the present embodiment, the fluoride negative electrode layer 4 of the present disclosure may be a negative electrode mixture layer including a negative electrode active material and an electrolyte having fluoride ion conductivity.

The negative electrode active material is a material that can occlude and release fluoride ions as the battery is charged and discharged. The occlusion and releasing include both a form accompanied by a chemical reaction with fluoride ions and a form not accompanied by a chemical reaction, such as intercalation. The chemical reaction includes a reaction of forming a compound and a reaction of forming a complex other than a compound such as an alloy and a solid solution. In the present embodiment, the negative electrode layer 4 can be constituted of the fluoride ion active material of the present disclosure.

The negative electrode active material is a material showing a base potential when displayed by a standard electrode potential compared with the positive electrode active material of the positive electrode layer 2 combined in the battery 1.

The thickness of the negative electrode layer 4 is, for example, 1 to 500 μm. The thickness of the negative electrode layer 4 can be 1 to 400 μm and further can be 50 to 200 μm. When the negative electrode layer 4 has a thickness within these ranges, the energy density of the battery 1 can be more improved, and more stable operation at high output is possible.

The specific configuration of the negative electrode layer 4 is not limited. The negative electrode layer 4 is, for example, a thin film including a negative electrode active material and a fluoride ion conductive material. The negative electrode layer 4 can include particles of a negative electrode active material and particles of a fluoride ion conductive material. The particles of the negative electrode active material can be particles of the fluoride ion active material of the present disclosure.

The negative electrode layer 4 can include a material other than the above-mentioned materials, as long as the battery 1 functions as a fluoride ion secondary battery.

The positive electrode layer 2 and the negative electrode layer 4 can each include a conductive assistant. The layer containing a conductive assistant can have reduced electrode resistance.

The conductive assistant is not limited as long as it has electron conductivity. The conductive assistant is, for example, graphite, such as natural graphite and artificial graphite; carbon black, such as acetylene black and Ketjen black; conductive fibers, such as carbon fibers and metal fibers; metal powder, such as carbon fluoride and aluminum; conductive whiskers, such as zinc oxide and potassium titanate; conductive metal oxides, such as titanium oxide; and conductive polymer compounds, such as polyaniline, polypyrrole, and polythiophene. The use of a carbon-based conductive assistant, such as graphite and carbon black, can reduce the cost of the battery 1.

The content proportions of the electrode active material, the electrolyte, and the conductive assistant in each of the positive electrode layer 2 and the negative electrode layer 4 are not limited.

The positive electrode layer 2 and the negative electrode layer 4 can each include at least one selected from the electrode active material, the electrolyte, and the conductive assistant in a particle state.

The layer including a material in a particle state can further include a binder that binds the particles to each other. The binder can improve the binding properties between the particles in the layer. In addition, the binder can improve the bondability (adhesive strength) between adjacent layers. The binder can improve the bondability between, for example, the positive electrode layer 2 or the negative electrode layer 4 and the current collector 5 or 6 adjacent to the layer. Such improvement in the bondability contributes to a reduction in the thickness of each layer. This is because, for example, in the positive electrode layer 2 and the negative electrode layer 4, the electrode active materials can be brought into contact with each other more reliably. In the electrolyte layer 3, it is possible to bring the electrolytes into contact with each other more reliably. A reduction in the thickness of each layer can further improve the energy density of the battery 1.

The binder is not limited. The binder is, for example, a binder made of a fluorine-based resin, such as polyvinylidene fluoride (PVdF), polytetrafluoroethylene (PTFE), a tetrafluoroethylene-hexafluoropropylene copolymer (FEP), a tetrafluoroethylene-hexafluoroethylene copolymer, a Teflon (registered trademark) binder, poly(vinylidene fluoride), a tetrafluoroethylene-perfluoroalkyl vinyl ether copolymer (PFA), a vinylidene fluoride-hexafluoropropylene copolymer, a vinylidene fluoride-chlorotrifluoroethylene copolymer, an ethylene-tetrafluoroethylene copolymer (ETFE), polychlorotrifluoroethylene (PCTFE), a vinylidene fluoride-hexafluoropropylene-tetrafluoroethylene copolymer, a vinylidene fluoride-perfluoromethyl vinyl ether-tetrafluoroethylene copolymer, or an ethylene chlorotrifluoroethylene copolymer (ECTFE); a polymer compound, such as carboxymethyl cellulose, polyacrylonitrile, polyethylene oxide, polypropylene oxide, polyvinyl chloride, polymethyl methacrylate, polymethyl acrylate, polymethacrylic acid or a metal salt thereof, polyacrylic acid or a metal salt thereof, polyvinyl alcohol, polyvinylidene chloride, polyethyleneimine, polymethacrylonitrile, polyvinyl acetate, polyimide, polyamic acid, polyamideimide, polyethylene, polypropylene, an ethylene-propylene-diene terpolymer, nitrocellulose, an ethylene-acrylic acid copolymer or a $Na^+$ ion crosslinked product thereof, an ethylene-methacrylic acid copolymer or a $Na^+$ ion crosslinked product thereof, an ethylene-methyl acrylate copolymer or a $Na^+$ ion crosslinked product thereof, an ethylene-methyl methacrylate copolymer or a $Na^+$ ion crosslinked product thereof, a polyester resin, a monoalkyl trialkoxysilane polymer, or a polymer prepared by copolymerization of a monoalkyl trialkoxysilane polymer and a tetraalkoxysilane monomer; or a rubber-like polymer, such as styrene butadiene rubber (SBR), butadiene rubber (BR), a styrene-isoprene copolymer, an isobutylene-isoprene copolymer (butyl rubber), acrylonitrile-butadiene rubber, an ethylene-propylene-diene copolymer, an acrylonitrile-butadiene copolymer (NBR), hydrogenated SBR, hydrogenated NBR, ethylene-propylene-dienemer (EPDM), or sulfonated EPDM.

When the binder is an insulative material that does not conduct fluoride ions and/or electrons, if the content percentage of the binder in each layer is excessively high, the charge-discharge behavior of the battery is decreased, or the energy density may decrease on the contrary. From this viewpoint, the content percentage of the binder in the layer including the binder that is the insulative material is, for example, 20 wt % or less and can be 5 wt % or less.

In the battery 1, all of the positive electrode layer 2, the electrolyte layer 3, and the negative electrode layer 4 may include a binder. In addition, it may be configured such that at least one layer selected from the positive electrode layer 2, the electrolyte layer 3, and the negative electrode layer 4 does not include a binder.

The battery 1 illustrated in FIG. 1 further includes a positive electrode current collector 5 and a negative electrode current collector 6. The positive electrode current collector 5 is in contact with the positive electrode layer 2. The negative electrode current collector 6 is in contact with the negative electrode layer 4. The positive electrode current collector 5 and the negative electrode current collector 6 sandwich the stacked body composed of the positive electrode layer 2, the electrolyte layer 3, and the negative electrode layer 4.

The positive electrode current collector 5 and the negative electrode current collector 6 have electron conductivity. The positive electrode current collector 5 and the negative electrode current collector 6 can be made of a material that has electron conductivity and is not easily corroded in the charge and discharge environment of the battery 1.

The positive electrode current collector 5 can be made of, for example, a metal material such as aluminum, gold, platinum, or an alloy thereof. The shape of the positive electrode current collector 5 is not limited and is, for example, a sheet or a film. The positive electrode current collector 5 can be a porous or nonporous sheet or film. As the sheet and film, foil and mesh are included. Aluminum and an alloy thereof are inexpensive and are easily formed into a thin film. The positive electrode current collector 5 can be made of carbon-coated aluminum. The thickness of the positive electrode current collector 5 is, for example, 1 to 30 μm. When the positive electrode current collector 5 has a thickness within this range, the strength of the current collector can be more reliably secured, for example, the crack and breakage of the current collector are suppressed, and the energy density of the battery 1 can be more reliably secured.

The positive electrode current collector 5 can have a positive electrode terminal.

The negative electrode current collector 6 is made of, for example, a metal material such as gold, platinum, aluminum, or an alloy thereof. The shape of the negative electrode current collector 6 is not limited and is, for example, a sheet or a film. The negative electrode current collector 6 can be a porous or nonporous sheet or film. As the sheet and film, foil and mesh are included. Aluminum and an alloy thereof are inexpensive and are easily formed into a thin film. The negative electrode current collector 6 can be made of carbon-coated aluminum. The thickness of the negative electrode current collector 6 is, for example, 1 to 30 μm. When the negative electrode current collector 6 has a thickness within this range, the strength of the current collector can be more reliably secured, for example, the crack and breakage of the current collector are suppressed, and the energy density of the battery 1 can be more reliably secured.

The negative electrode current collector 6 can have a negative electrode terminal.

Incidentally, the fluoride ion active material of the present disclosure can also be used as a positive electrode active material. When the fluoride ion active material of the present disclosure is used as the positive electrode active material of the fluoride ion secondary battery, the negative electrode active material includes at least one element selected from, for example, Be, Sc, Rb, Ce, Cs, Mg, K, Na, La, Y, Ba, Sr, Ca, and Li. The negative electrode active material can be a simple substance, complex such as an alloy and a solid solution, or compound of the at least one element above. The compound may be, for example, a fluoride of the above-mentioned metal.

The fluoride ion secondary battery of the present disclosure can include an arbitrary member and configuration other than those described above as long as it can be used as a secondary battery capable of charging and discharging.

The shape of the fluoride ion secondary battery of the present disclosure is not limited. The shape may be a shape of a known secondary battery. Examples of the shape include a rectangle, a circle, an ellipse, and a hexagon. The fluoride ion secondary battery of the present disclosure may have a configuration in which single batteries illustrated in the embodiment are further stacked or are folded. In such a case, the fluoride ion secondary battery of the present disclosure can have various battery shapes, such as a cylindrical, square, button, coin, or flat shape.

The method for manufacturing the fluoride ion secondary battery of the present disclosure is not limited. The fluoride ion secondary battery of the present disclosure can be manufactured by applying a known method for manufacturing a secondary battery, typically, an all-solid-state secondary battery except that the fluoride ion active material of the present disclosure is used in the negative electrode layer.

Each layer constituting the fluoride ion secondary battery of the present disclosure can be formed by applying a known thin-film forming procedure. The thin-film forming procedure is, for example, a chemical deposition method or a physical deposition method. Specific examples of the physical deposition method are a sputtering method, a vacuum deposition method, an ion plating method, and a PLD method in which a target is irradiated with a pulse laser for deposition. Examples of the chemical deposition method are chemical vapor deposition (CVD) methods such as plasma CVD, thermal CVD, and laser CVD; liquid phase deposition methods, for example, wet plating methods such as electroplating, immersion plating, and electroless plating; a sol-gel method; an MOD method; a spray thermal decomposition method; and printing technology such as a doctor blade method using a fine particle dispersion, a spin coating method, an ink jet method, and screen printing method. The thin-film forming procedure is not limited to these examples.

Examples of the fluoride ion active material of the present disclosure will now be described. Incidentally, the fluoride ion active material of the present disclosure is not limited to the materials exemplified below.

Example 1

In Example 1, samples of fluoride ion active materials of various different types of the metal element Me were produced, and the charge-discharge behavior thereof was evaluated.

Production of Samples 1 to 12 of Fluoride Ion Active Material

Sample 1

Particles of $AlF_3$ (manufactured by Kojundo Chemical Laboratory Co., Ltd.) were weighed and were then milled with a planetary ball mill at a rotation speed of 600 rpm for 6 hours. Subsequently, the milled particles were burned in an argon atmosphere at a temperature of 700° C. for 1 hour. Then, the burned particles, ethylene black (AB), and $La_{0.9}Ca_{0.1}F_{2.9}$ as a solid electrolyte were weighed at a weight ratio of 25:5:70 and were mixed. Subsequently, this mixture was milled with a planetary ball mill at a rotation speed of 200 rpm for 27 hours. Consequently, a fluoride ion active material was produced.

Sample 2

Particles of $AlF_3$ (manufactured by Kojundo Chemical Laboratory Co., Ltd.) and particles of $TiF_3$ (manufactured by Sigma-Aldrich Co. LLC.) were weighed such that the molar ratio between Al and Ti, $AlF_3:TiF_3$, was 97:3 and were mixed. Subsequently, this mixture was milled with a planetary ball mill at a rotation speed of 600 rpm for 6 hours. Subsequently, the milled particles were burned in an argon atmosphere at a temperature of 700° C. for 1 hour. Then, the burned particles, AB, and $La_{0.9}Ca_{0.1}F_{2.9}$ as a solid electrolyte were weighed at a weight ratio of 25:5:70 and were mixed. Subsequently, this mixture was milled with a planetary ball mill at a rotation speed of 200 rpm for 27 hours. Consequently, a fluoride ion active material was obtained.

Sample 3

A fluoride ion active material was prepared as in sample 2 except that particles of $AlF_3$ and particles of $TiF_4$ (manufactured by Sigma-Aldrich Co. LLC.) were weighed such that the molar ratio of $AlF_3:TiF_4$ was 97:3 and were mixed.

Sample 4

A fluoride ion active material was prepared as in sample 2 except that particles of $AlF_3$ and particles of $FeF_3$ (manufactured by Sigma-Aldrich Co. LLC.) were weighed such that the molar ratio of $AlF_3:FeF_3$ was 97:3 and were mixed.

Sample 5

A fluoride ion active material was prepared as in sample 2 except that particles of $AlF_3$ and particles of $FeF_2$ (manufactured by Sigma-Aldrich Co. LLC.) were weighed such that the molar ratio of $AlF_3:FeF_2$ was 97:3 and were mixed.

Sample 6

A fluoride ion active material was prepared as in sample 2 except that particles of $AlF_3$ and particles of $CoF_3$ (manufactured by Sigma-Aldrich Co. LLC.) were weighed such that the molar ratio of $AlF_3:CoF_3$ was 97:3 and were mixed.

Sample 7

A fluoride ion active material was prepared as in sample 2 except that particles of $AlF_3$ and particles of $CoF_2$ (manufactured by Sigma-Aldrich Co. LLC.) were weighed such that the molar ratio of $AlF_3:CoF_2$ was 97:3 and were mixed.

Sample 8

A fluoride ion active material was prepared as in sample 2 except that particles of $AlF_3$ and particles of $NiF_2$ (manufactured by Sigma-Aldrich Co. LLC.) were weighed such that the molar ratio of $AlF_3:NiF_2$ was 97:3 and were mixed.

Sample 9

A fluoride ion active material was prepared as in sample 2 except that particles of $AlF_3$ and particles of $CuF_2$ (manufactured by Sigma-Aldrich Co. LLC.) were weighed such that the molar ratio of $AlF_3:CuF_2$ was 97:3 and were mixed.

Sample 10

A fluoride ion active material was prepared as in sample 2 except that particles of $AlF_3$ and particles of $CaF_2$ (manufactured by Kojundo Chemical Laboratory Co., Ltd.) were weighed such that the molar ratio of $AlF_3:CaF_2$ were 97:3 and were mixed.

Sample 11

A fluoride ion active material was prepared as in sample 2 except that particles of $AlF_3$ and particles of $SrF_2$ (manufactured by Kojundo Chemical Laboratory Co., Ltd.) were weighed such that the molar ratio of $AlF_3:SrF_2$ was 97:3 and were mixed.

Sample 12

A fluoride ion active material was prepared as in sample 2 except that particles of $AlF_3$ and particles of $BaF_2$ (manufactured by Kojundo Chemical Laboratory Co., Ltd.) were weighed such that the molar ratio of $AlF_3:BaF_2$ was 97:3 and were mixed.

Sample 1 is a reference sample represented by $AlF_3$, and other samples 2 to 12 are fluoride ion active materials containing Al, F, and Me produced using $AlF_3$ and $MeF_2$ (Me is Ti, Fe, Co, Ni, Cu, Ca, Sr, or Ba) as raw materials.

Method for Evaluating Fluoride Ion Active Material

Cells for charge and discharge evaluation were produced using the fluoride ion active materials of the sample as the respective negative electrode active materials, and the charge capacity and the discharge capacity of each fluoride ion active material were measured. The method for producing the cells for charge and discharge evaluation and the method for measuring the charge and discharge capacities are as follows.

First, 0.20 g of the solid electrolyte material was weighed. The weighed material was accommodated in a metal tube having a diameter of 10 mm and was pre-pressed at a temperature of 25° C. and a pressure of 6 MPa for 1 minute to form a disk-like (diameter: 10 mm) electrolyte layer 3 (see FIG. 1). Subsequently, 0.01 g of the fluoride ion active material (negative electrode active material) produced by the method above, a powder of a solid electrolyte material, and acetylene black as a binder were mixed to produce a mixed material. This mixed material was disposed on one surface of the electrolyte layer 3, and the mixture and the electrolyte layer 3 were pre-pressed at a temperature of 25° C. and a pressure of 10 MPa for 1 minute. Consequently, a disk-like (diameter: 10 mm) negative electrode layer 4 was formed. Subsequently, gold foil having a diameter of 10 mm and a thickness of 10 μm was disposed as a negative electrode current collector 6 on the surface of the negative electrode layer 4 on the side opposite to the electrolyte layer 3 side. Subsequently, the electrolyte layer 3, the negative electrode layer 4, and the negative electrode current collector 6 were pressed at a temperature of 25° C. and a pressure of 40 MPa for 1 minute. Subsequently, lead foil having a diameter of 10 mm and a thickness of 200 μm as a positive electrode layer 2 and aluminum foil having a diameter of 10 mm and a thickness of 10 μm as a positive electrode current collector 5 were disposed on the surface of the electrolyte layer 3 on the side opposite to the negative electrode layer 4 side. Subsequently, the positive electrode current collector 5, the positive electrode layer 2, the electrolyte layer 3, the negative electrode layer 4, and the negative electrode current collector 6 were pressed at a temperature of 25° C. and a pressure of 8 MPa for 1 minute to produce a cell 1 for charge and discharge evaluation.

Figure 2:
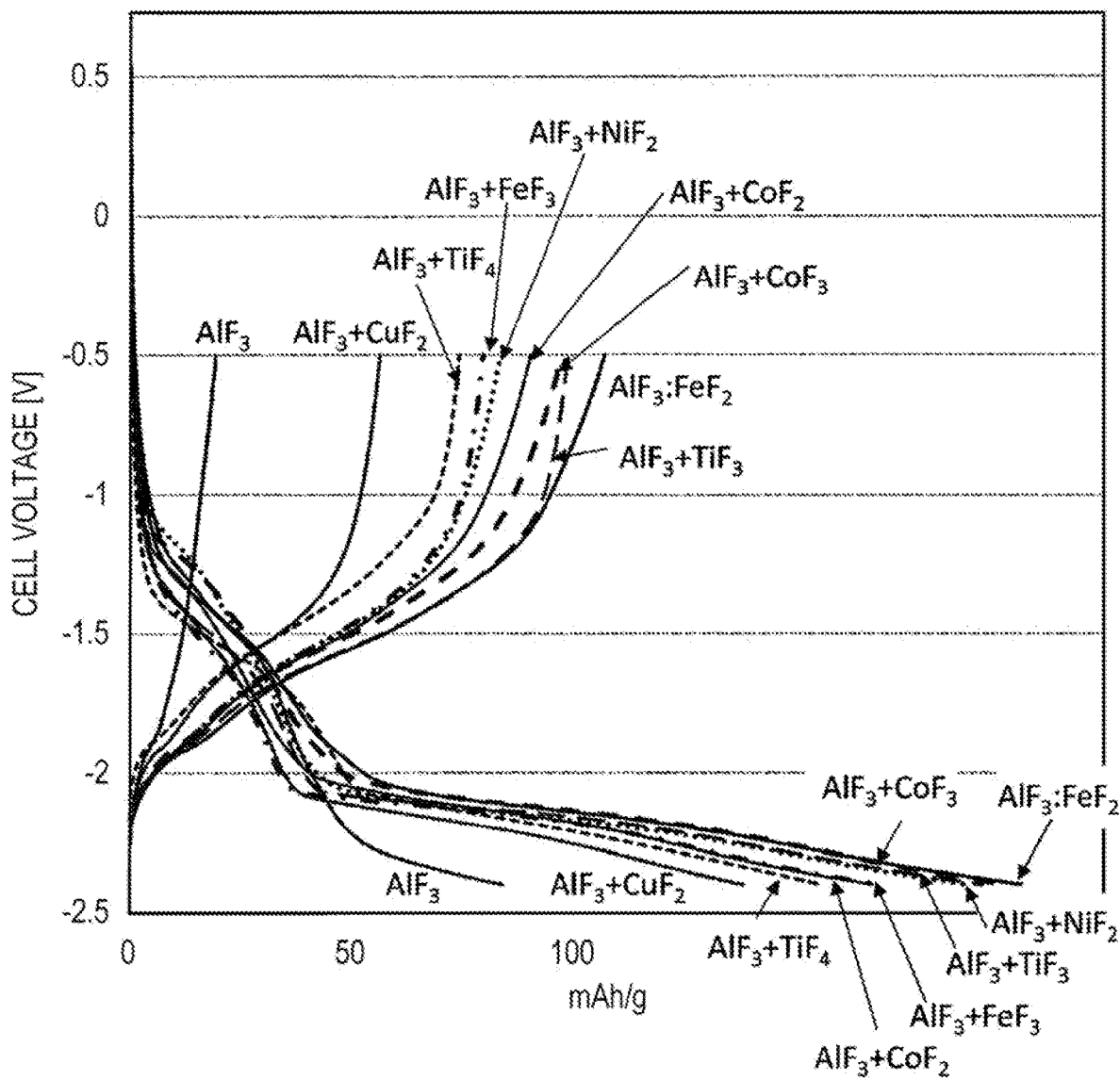
FIG. 2 shows charge-discharge behaviors of a part of samples mentioned in Table 1.

Next, a potentiostat was connected to both current collectors of the produced cell 1, and the charge capacity and the discharge capacity were measured while holding the cell 1 at 140° C. The charge capacity was measured with an upper limit cutoff voltage of −2.4 V and charging at a constant current of −0.04 mA. The discharge capacity was measured with a cutoff voltage of −0.5 V and discharging at a constant current of 0.2 mA. Incidentally, the solid electrolyte material used was $La_{0.9}Ca_{0.1}F_{2.9}$. The charge capacities and the discharge capacities of the fluoride ion active materials of samples 1 to 12 are shown in Table 1 below. Incidentally, the description in the column of "Composition ratio" of Table 1 and Table 2 described below shows the composition of the materials used and the molar ratio of each material. In addition, charge-discharge behaviors of a part of the samples are shown in FIG. 2.

TABLE 1

| | Composition ratio | Charge capacity [mAh/g] | Discharge capacity [mAh/g] |
|---|---|---|---|
| Sample 1 | $AlF_3:TiF_3$ = 100:0 | 84 | 19 |
| Sample 2 | $AlF_3:TiF_3$ = 97:3 | 192 | 99 |
| Sample 3 | $AlF_3:TiF_4$ = 97:3 | 156 | 74 |
| Sample 4 | $AlF_3:FeF_3$ = 97:3 | 169 | 80 |
| Sample 5 | $AlF_3:FeF_2$ = 97:3 | 201 | 107 |
| Sample 6 | $AlF_3:CoF_3$ = 97:3 | 198 | 98 |
| Sample 7 | $AlF_3:CoF_2$ = 97:3 | 168 | 90 |
| Sample 8 | $AlF_3:NiF_2$ = 97:3 | 189 | 84 |
| Sample 9 | $AlF_3:CuF_2$ = 97:3 | 138 | 57 |
| Sample 10 | $AlF_3:CaF_2$ = 97:3 | 179 | 42 |

TABLE 1-continued

| | Composition ratio | Charge capacity [mAh/g] | Discharge capacity [mAh/g] |
|---|---|---|---|
| Sample 11 | $AlF_3:SrF_2 = 97:3$ | 121 | 32 |
| Sample 12 | $AlF_3:BaF_2 = 97:3$ | 130 | 66 |

As shown in Table 1, the negative electrode active materials of samples 2 to 10 showed discharge capacities and charge capacities higher than those of sample 1 ($AlF_3$) as the reference sample. In particular, samples 2 to 8 and 10 containing a transition metal Ti, Fe, Co, or Ni or an alkaline-earth metal Ca showed a charge capacity of 150 mAh/g or more.

Subsequently, the phase compositions of samples 1 to 12 were analyzed by an X-ray diffraction (XRD) method. The results are shown in FIG. 3.

Figure 3:
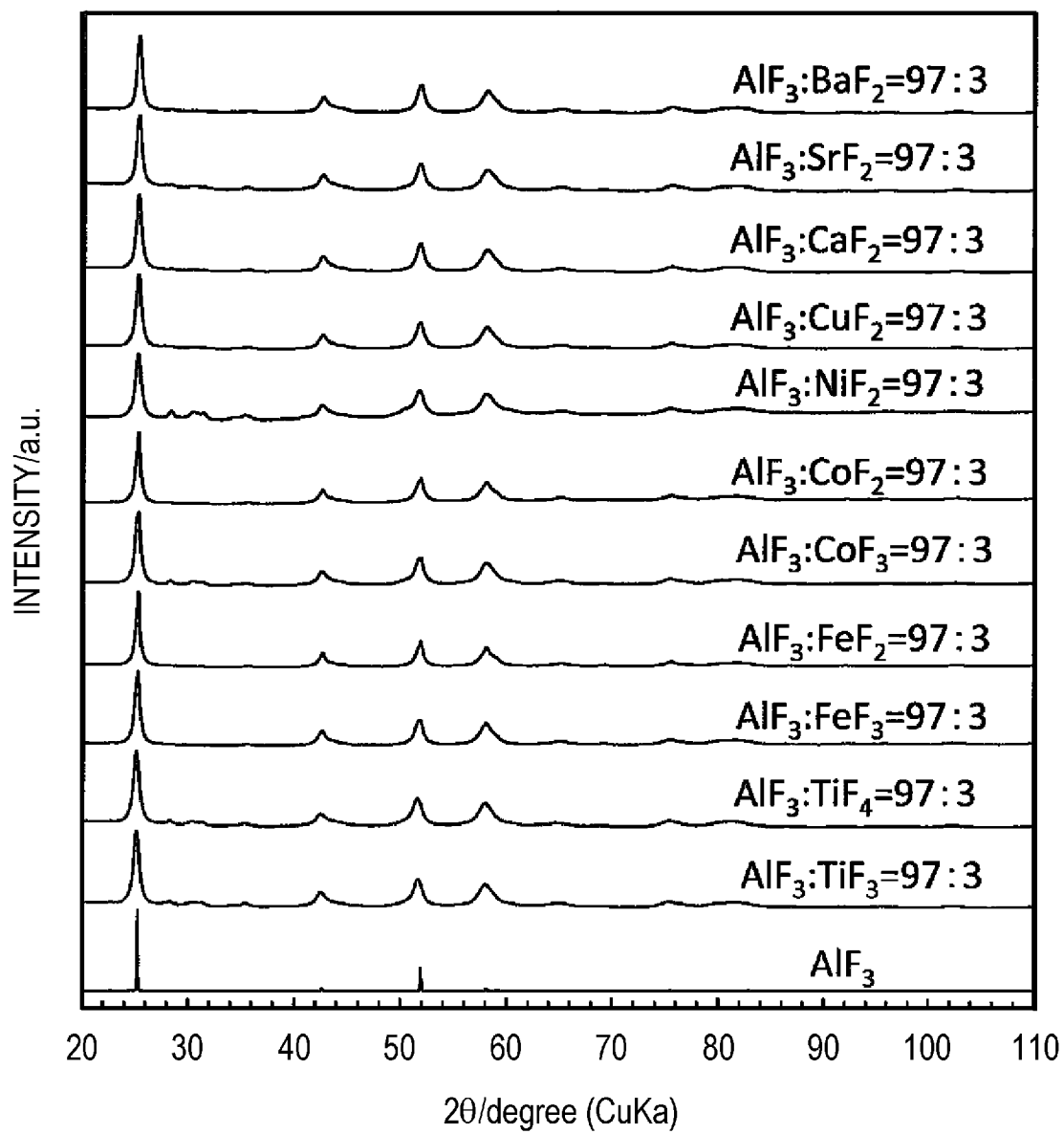
FIG. 3 shows XRD spectra of samples mentioned in Table 1.

As shown in FIG. 3, the half widths of diffraction peaks of samples 2 to 12 were larger than that of the diffraction peak of sample 1 ($AlF_3$). In addition, the positions of the main diffraction peaks of samples 2 to 12 tended to shift to the lower angle side with respect to the position of the main diffraction peak of sample 1 ($AlF_3$) as the reference sample. On the other hand, except for the peak shift above, no new peak was observed in the XRD spectra of samples 2 to 12 at the diffraction angle where no peak was observed in sample 1 ($AlF_3$).

The peak shift is inferred to be caused by substitution of a part of the Al site of the crystal structure (octahedron structure) of $AlF_3$ with a metal element Me (Ti, Fe, Co, Ni, Cu, Ca, Ba, or Sr) having a different ionic radius. Since no new peak was observed, it is inferred that the total amount (excluding a small amount of the residue that cannot be detected by an XRD method) of the metal element Me forms a crystal structure with Al.

The above demonstrates that in samples 2 to 12, a part of Al in $AlF_3$ is substituted with Me of $MeF_2$ used as the raw material to form a fluorine compound including Al, Me, and F.

Example 2

Samples of fluoride ion active materials having different molar ratios of the metal element Me (here, Ti) were produced, and the charge-discharge behaviors thereof were evaluated.

Production of Samples 13 to 23 of Fluoride Ion Active Material

Next, particles of $AlF_3$ (manufactured by Kojundo Chemical Laboratory Co., Ltd.) and particles of $TiF_3$ (manufactured by Sigma-Aldrich Co. LLC.) were weighed and mixed to produce samples 13 to 23 having different molar ratios of $TiF_3$ to $AlF_3$.

Sample 13
A fluoride ion active material was prepared as in sample 2 except that the particles of $AlF_3$ and the particles of $TiF_3$ were weighed such that the molar ratio $AlF_3:TiF_3$ was 99:1 and were mixed.

Sample 14
Sample 14 was the same fluoride ion active material as that of sample 2.

Sample 15
A fluoride ion active material was prepared as in sample 2 except that the particles of $AlF_3$ and the particles of $TiF_3$ were weighed such that the molar ratio $AlF_3:TiF_3$ was 90:10 and were mixed.

Sample 16
A fluoride ion active material was prepared as in sample 2 except that the particles of $AlF_3$ and the particles of $TiF_3$ were weighed such that the molar ratio $AlF_3:TiF_3$ was 85:15 and were mixed.

Sample 17
A fluoride ion active material was prepared as in sample 2 except that the particles of $AlF_3$ and the particles of $TiF_3$ were weighed such that the molar ratio $AlF_3:TiF_3$ was 80:20 and were mixed.

Sample 18
A fluoride ion active material was prepared as in sample 2 except that the particles of $AlF_3$ and the particles of $TiF_3$ were weighed such that the molar ratio $AlF_3:TiF_3$ was 70:30 and were mixed.

Sample 19
A fluoride ion active material was prepared as in sample 2 except that the particles of $AlF_3$ and the particles of $TiF_3$ were weighed such that the molar ratio $AlF_3:TiF_3$ was 60:40 and were mixed.

Sample 20
A fluoride ion active material was prepared as in sample 2 except that the particles of $AlF_3$ and the particles of $TiF_3$ were weighed such that the molar ratio $AlF_3:TiF_3$ was 50:50 and were mixed.

Sample 21
A fluoride ion active material was prepared as in sample 2 except that the particles of $AlF_3$ and the particles of $TiF_3$ were weighed such that the molar ratio $AlF_3:TiF_3$ was 30:70 and were mixed.

Sample 22
A fluoride ion active material was prepared as in sample 2 except that the particles of $AlF_3$ and the particles of $TiF_3$ were weighed such that the molar ratio $AlF_3:TiF_3$ was 10:90 and were mixed.

Sample 23
A fluoride ion active material was prepared as in sample 2 except that only the particles of $TiF_3$ were used as the raw material.

Sample 23 is a reference sample represented by $TiF_3$, and other samples 13 to 22 are fluoride ion active materials containing Al, F, and Ti produced using $AlF_3$ and $TiF_3$ as raw materials.

Method for Evaluating Fluoride Ion Active Material

As in Example 1, cells for charge and discharge evaluation were produced using the fluoride ion active materials of samples 13 to 23 as the negative electrode active materials, and the charge capacity and the discharge capacity of each fluoride ion active material were measured.

Figure 4A:
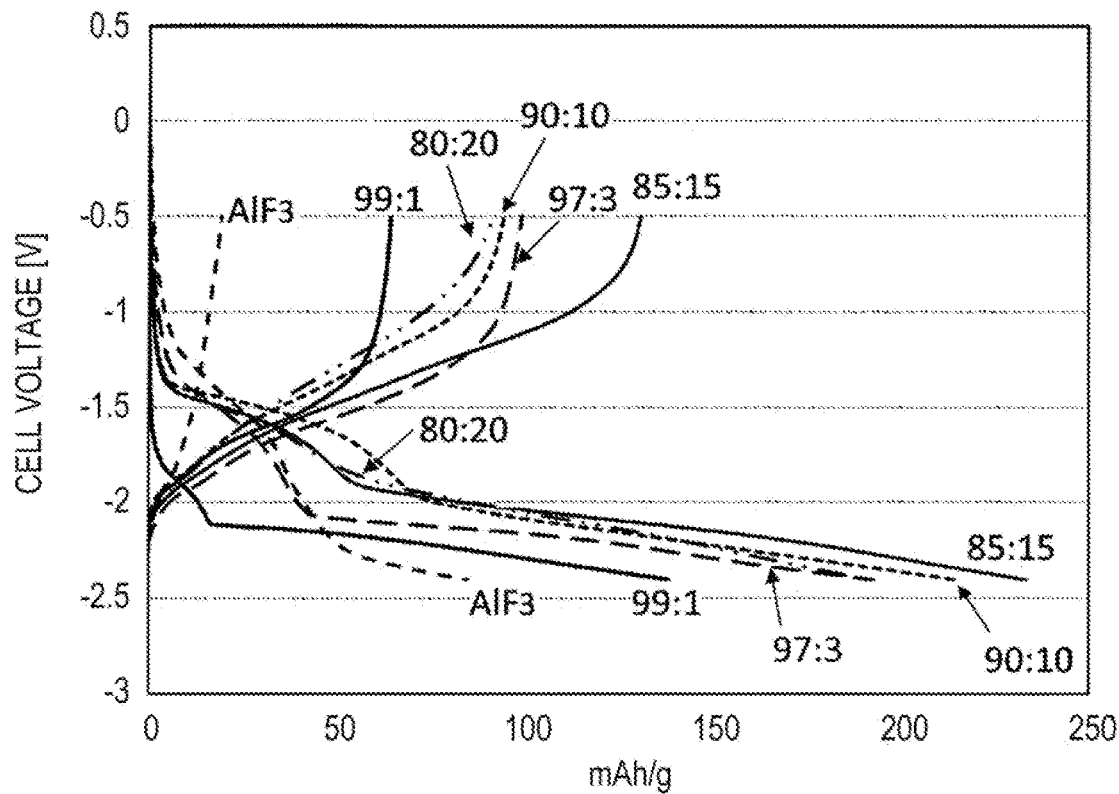
FIG. 4A shows charge-discharge behaviors of a part of samples mentioned in Table 2.
Figure 4B:
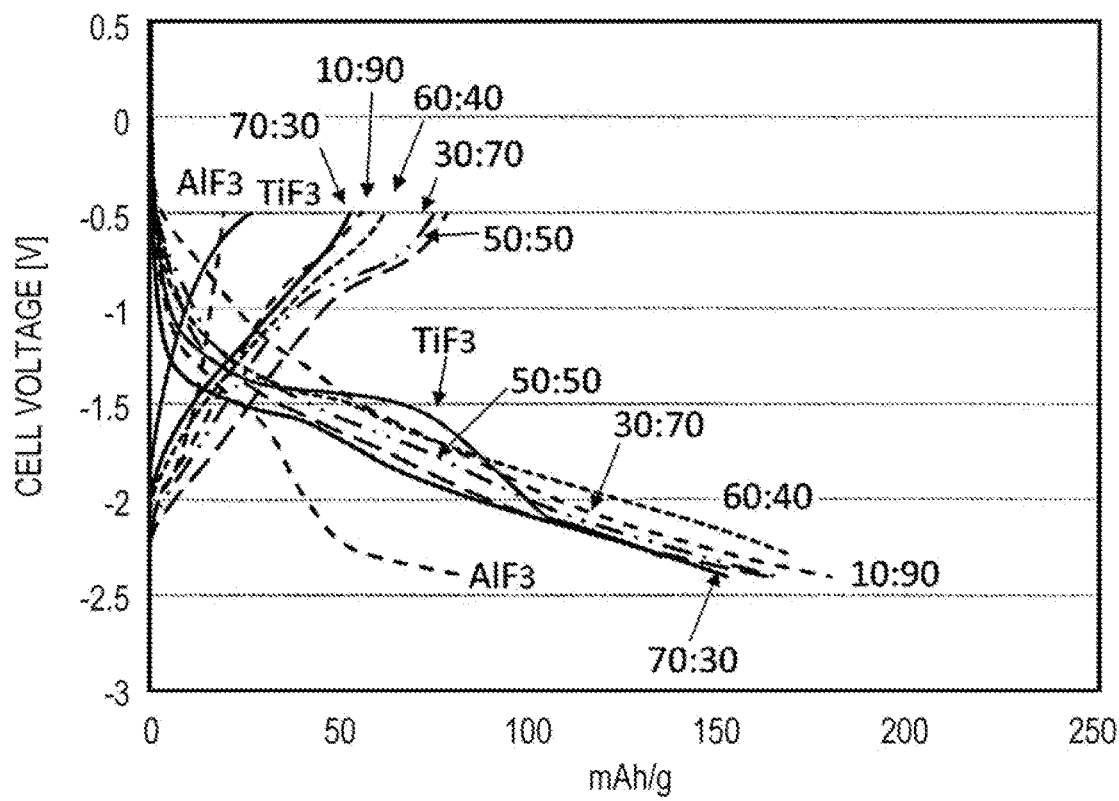
FIG. 4B shows charge-discharge behaviors of a part of samples mentioned in Table 2.

The charge capacity and the discharge capacity of the fluoride ion active material of each of samples 13 to 23 are shown in Table 2. For comparison, the charge capacity and the discharge capacity of sample 1 ($AlF_3$) in Example 1 are also shown in Table 2. In addition, the charge-discharge behaviors of samples 1 and 13 to 17 are shown in FIG. 4A, and the charge-discharge behaviors of samples 1 and 18 to 23 are shown in FIG. 4B.

TABLE 2

| | Composition ratio | Charge capacity [mAh/g] | Discharge capacity [mAh/g] |
|---|---|---|---|
| Sample 1 | $AlF_3:TiF_3 = 100:0$ | 84 | 19 |
| Sample 13 | $AlF_3:TiF_3 = 99:1$ | 138 | 64 |
| Sample 14 | $AlF_3:TiF_3 = 97:3$ | 192 | 99 |

TABLE 2-continued

|  | Composition ratio | Charge capacity [mAh/g] | Discharge capacity [mAh/g] |
|---|---|---|---|
| Sample 15 | $AlF_3:TiF_3 = 90:10$ | 215 | 94 |
| Sample 16 | $AlF_3:TiF_3 = 85:15$ | 233 | 131 |
| Sample 17 | $AlF_3:TiF_3 = 80:20$ | 190 | 91 |
| Sample 18 | $AlF_3:TiF_3 = 70:30$ | 152 | 53 |
| Sample 19 | $AlF_3:TiF_3 = 60:40$ | 185 | 62 |
| Sample 20 | $AlF_3:TiF_3 = 50:50$ | 163 | 78 |
| Sample 21 | $AlF_3:TiF_3 = 30:70$ | 165 | 75 |
| Sample 22 | $AlF_3:TiF_3 = 10:90$ | 179 | 55 |
| Sample 23 | $AlF_3:TiF_3 = 0:100$ | 135 | 27 |

As shown in Table 2, the negative electrode active materials of samples 13 to 22 showed discharge capacities and charge capacities higher than those of sample 1 ($AlF_3$) and sample 23 ($TiF_3$) as the reference samples.

Figure 5:
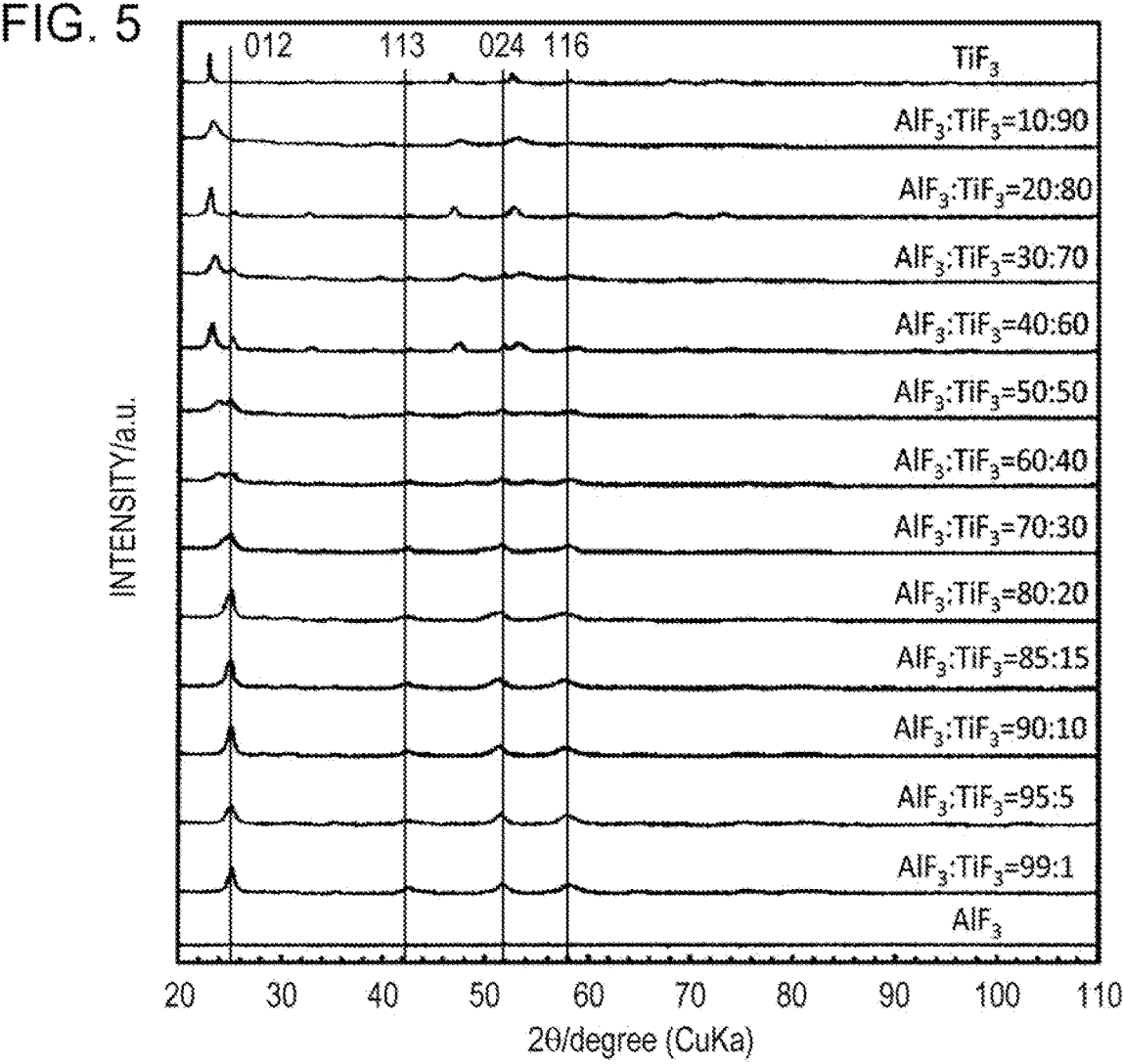
FIG. 5 shows XRD spectra of samples mentioned in Table 2.

Subsequently, the phase compositions of samples 13 to 23 were analyzed by an X-ray diffraction (XRD) method. The results are shown in FIG. 5. For comparison, the result of analysis of sample 1 ($AlF_3$) in Example 1 is also shown in FIG. 5.

As shown in FIG. 5, although the positions of the diffraction peaks of samples 13 to 16 having the molar ratio of $AlF_3:TiF_3$ ranging from 99:1 to 85:15 tended to shift to the lower angle side with respect to the position of the diffraction peak of sample 1 ($AlF_3$) as the reference sample, no new peak was observed in the XRD spectra of samples 13 to 16 at the diffraction angle where no peak was observed in sample 1 ($AlF_3$).

On the other hand, in samples 17 to 22 having the molar ratio of $AlF_3:TiF_3$ ranging from 80:20 to 10:90, influence of a diffraction peak derived from $TiF_3$ as the reference sample was observed in addition to the diffraction peak of $AlF_3$ as the reference sample. This result demonstrates that samples 17 to 22 contain a compound or element derived from $TiF_3$ in addition to an $AlF_3$ compound having substitution of a part of Al. Here, as the compound or element derived from $TiF_3$, at least $TiF_3$ and Ti element are included. Incidentally, the analysis using XRD shown in FIG. 5 showed that the average voltage of sample 13 ($AlF_3:TiF_3=99:1$), which was presumed as a compound, was −1.55 V. In addition, since both peaks of $AlF_3$ and $TiF_3$ were observed in FIG. 5, the average voltage of sample 20 ($AlF_3:TiF_3=50:50$), which was presumed as a mixture, was −1.17 V. Accordingly, it can be said that the compound has a lower average voltage than the mixture.

Figure 6:
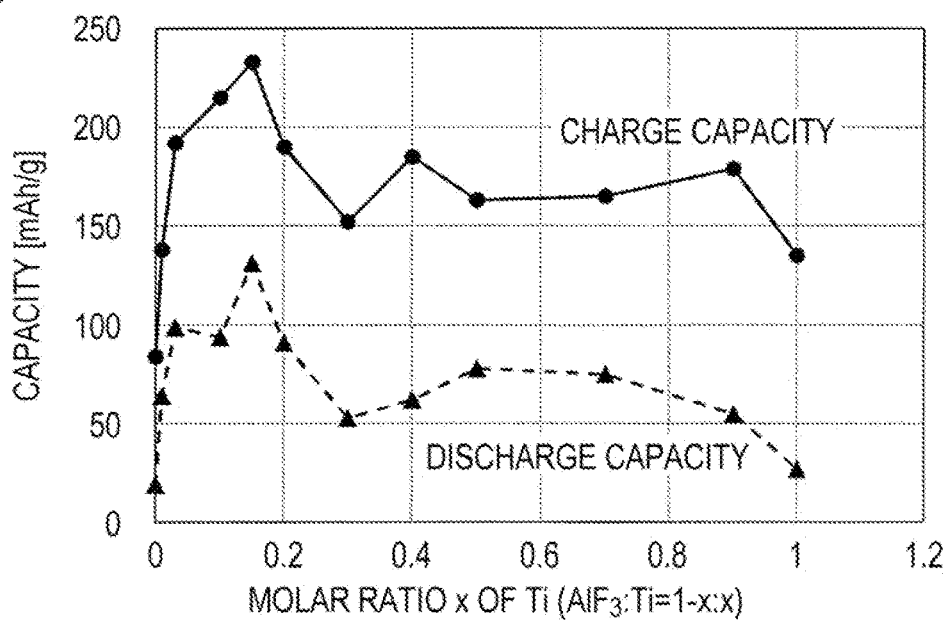
FIG. 6 shows relationships between molar ratio x of Ti and charge capacity and between molar ratio x of Ti and discharge capacity in the fluoride ion active materials of samples mentioned in Table 2.

FIG. 6 is a graph showing relationships between molar ratio x of Ti and charge capacity and between molar ratio x of Ti and discharge capacity in the fluoride ion active material of each sample. The molar ratio x is the number of moles of Ti with respect to the total number of moles of $AlF_3$ and Ti ($AlF_3:Ti=1-x:x$).

As shown in FIG. 6, the charge capacity and the discharge capacity were high in samples 13 to 16 in which the molar ratio x of $TiF_3$ with respect to the total number of moles of $AlF_3$ and $TiF_3$ was 0.01 to 0.15 (i.e., 1% to 15%) and were low in samples 17 to 22 in which the molar ratio x of $TiF_3$ was higher than 0.15 (i.e., 15%). The reason for this is inferred to be the possibility that when the molar ratio x is higher than 0.15 (i.e., 15%), Ti and/or titanium fluoride remaining beyond the solid solution limit of Ti is present in the periphery of the composite metal fluoride containing Al, Ti, and F. It is inferred that there is consequently a possibility of inhibiting insertion of fluoride ions into the composite metal fluoride and desorption of fluoride ions from the composite metal fluoride (fluoridation and defluoridation).

Incidentally, when the molar ratio x of $TiF_3$ is higher than 30%, the charge capacity and the discharge capacity increase again. It is inferred that this is caused by that the remaining titanium fluoride and titanium perform fluoridation and defluoridation together with the compound containing Al, Ti, and F.

It is inferred that when the molar ratio x of $TiF_3$ is greater than or equal to 1% and less than or equal to 15%, the amount of the composite metal fluoride containing Al, Ti, and F increases, and thereby the charge capacity and the discharge capacity are increased.

It is inferred that when the molar ratio x of $TiF_3$ is higher than or equal to 1% and less than or equal to 30%, unlike when the molar ratio x of $TiF_3$ is higher than 30%, the composite metal fluoride containing Al, Ti, and F predominantly performs charging and discharging. Since the reaction potential of $AlF_3$ is lower than that of $TiF_3$, it is inferred that samples 13 to 18 of which the molar ratio x of $TiF_3$ is higher than or equal to 1% and less than or equal to 30% can operate a battery with a lower voltage than samples 19 to 23 of which the molar ratio x of $TiF_3$ is higher than 30%.

The molar ratio x of $TiF_3$ may be higher than 30% or less than 90%. Consequently, the charge capacity and the discharge capacity can be more increased, for example, than sample 18 having a molar ratio x of 30%.

The fluoride ion conductive material and the fluoride ion secondary battery of the present disclosure are not limited to the embodiments described above and can be variously modified or changed within the scope of the disclosure described in claims. For example, the technical features shown in the embodiments described in the Description of Embodiments can be appropriately replaced or combined to solve some or all of the above-described problems or to achieve some or all of the above-described effects. In addition, if a technical feature is not described as essential in the specification, it can be appropriately deleted.

The composition of the fluoride ion active material of the present disclosure is not limited to the specific compositions shown in Tables 1 and 2. As described above, it is inferred that a fluoride ion active material showing the same effect as in Example 1 or 2 can be obtained by including Al, F, and the above-described alkaline-earth metal element and/or transition metal element. In particular, the charge capacity and the discharge capacity can be more effectively improved by substituting a part of the Al site with a metal element Me having a valence or ionic radius different from that of Al.

The use of the fluoride ion active material of the present disclosure is not limited. The fluoride ion active material of the present disclosure can be used, for example, in the negative electrode material or the positive electrode material of a fluoride ion secondary battery. The fluoride ion secondary battery of the present disclosure is expected to be applied to various uses as a rechargeable secondary battery.

What is claimed is:
1. An active material comprising:
a composite metal fluoride containing Al, F, and Ti, wherein
the active material is capable of occluding and releasing fluoride ions, and
the composite metal fluoride is represented by a compositional formula:

$$Al_{1-x}Ti_xF_y,$$

where x satisfies $0.15 \leq x \leq 0.3$ and y satisfies $2 \leq y \leq 4$.

2. The active material according to claim 1, wherein
the composite metal fluoride has a crystal structure; and
the Ti is located at Al site in the crystal structure.

3. A fluoride ion secondary battery comprising:
a positive electrode layer;
a negative electrode layer containing the active material according to claim 1; and
an electrolyte layer disposed between the positive electrode layer and the negative electrode layer.

4. The fluoride ion secondary battery according to claim 3, wherein
the positive electrode layer contains a positive electrode active material; and
the positive electrode active material contains at least one selected from the group consisting of Co, Cu, Bi, Sn, Pb, Fe, Zn, Ga, and C.

\* \* \* \* \*